Figure 1:
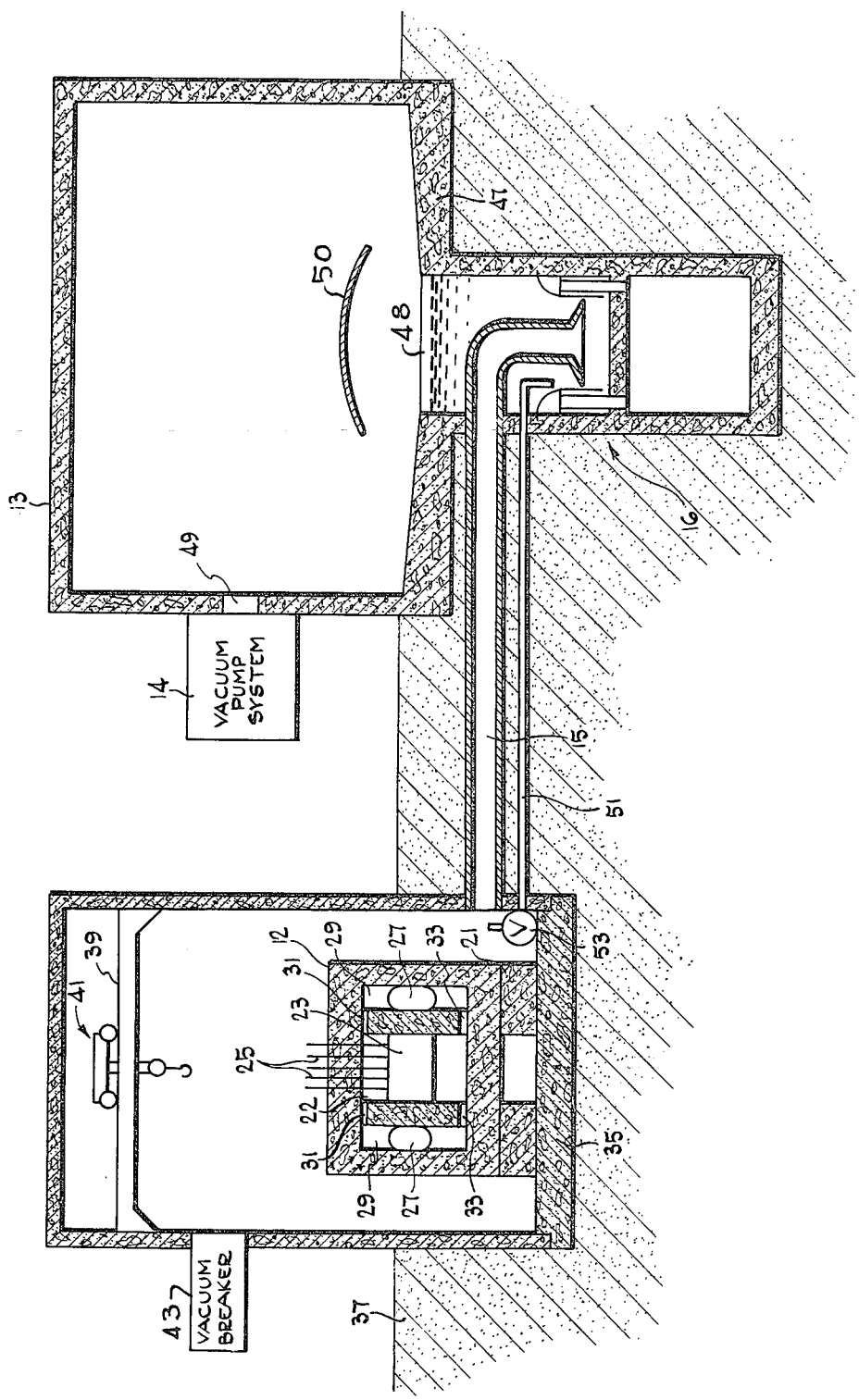

United States Patent [19]

Fay et al.

[11] 3,889,707

[45] June 17, 1975

[54] PRESSURE RELIEF SYSTEM FOR A NUCLEAR REACTOR

[75] Inventors: H. Peter Fay, Solana Beach; William S. Peck, North Shore, both of Calif.

[73] Assignee: General Atomic Company, San Diego, Calif.

[22] Filed: Nov. 19, 1971

[21] Appl. No.: 200,318

[52] U.S. Cl. .................. 137/251; 317/312; 176/38
[51] Int. Cl. ...... F16k 9/00; G21c 9/00; G21c 13/02
[58] Field of Search . 176/37, 38; 137/312, 251–254

[56] References Cited
UNITED STATES PATENTS

| | | | |
|---|---|---|---|
| 3,126,906 | 3/1964 | Touzalin et al. | 137/253 |
| 3,253,996 | 5/1966 | Bond et al. | 176/38 X |
| 3,375,162 | 3/1968 | Wilson | 176/37 |

FOREIGN PATENTS OR APPLICATIONS

| | | | |
|---|---|---|---|
| 1,175,924 | 8/1964 | Germany | 137/251 |

*Primary Examiner*—Robert G. Nilson
*Assistant Examiner*—Richard Gerard
*Attorney, Agent, or Firm*—Fitch, Even, Tabin & Luedeka

[57] ABSTRACT

A pressure relief and secondary containment system is described for containing an increase in pressure without leaking contaminants to the ambient atmosphere. A first containment enclosure is provided, which may be a building housing a nuclear reactor or a chemical processing system or the like which is capable of releasing contaminants in the event of an accident. A remote evacuated vessel or second containment enclosure is also provided. The first containment enclosure is relieved, in the event of an increase in pressure therein, to the second containment enclosure through a pressure regulating fluid seal. The fluid seal maintains a pressure differential between the first and the second containment enclosures during normal conditions.

6 Claims, 2 Drawing Figures

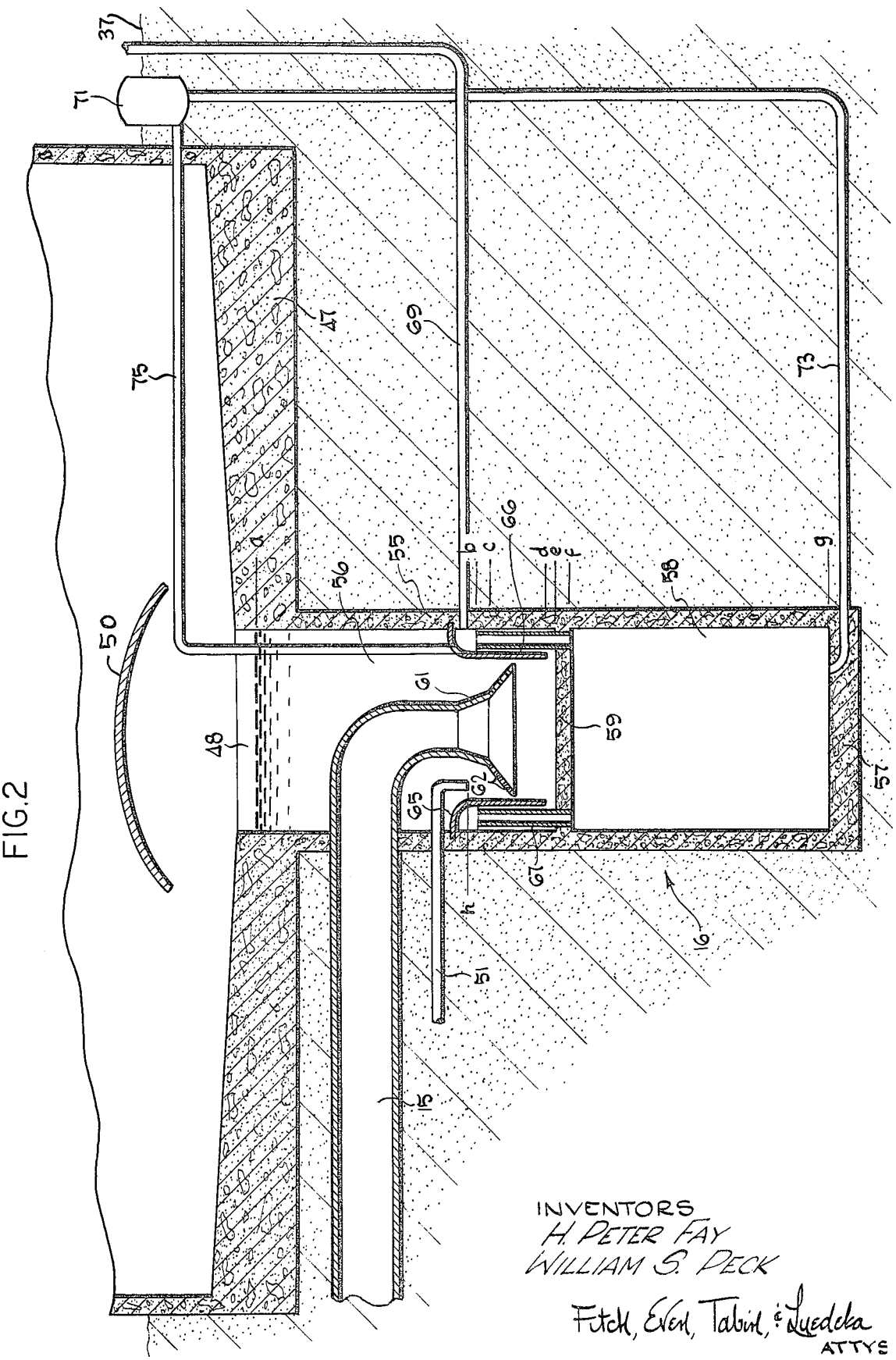

PRESSURE RELIEF SYSTEM FOR A NUCLEAR REACTOR

This invention relates generally to pressure relief systems and, more particularly, to a pressure relief system adapted to contain a dangerous increase in pressure.

The present invention may be employed in any situation in which a release of gaseous or gas entrained contaminants requires containment. Thus, the invention is applicable to nuclear reactors of various types, chemical processing equipment, and other analogous apparatus where an accident is accompanied by a release of contaminated gas. In the present specification, the description relates to a gas-cooled nuclear reactor with a pressurized vessel, but other types of nuclear reactors with or without pressurized vessels may also employ the invention to advantage.

Certain types of nuclear reactors employ a pressurized vessel enclosing the reactor core. For example, gas cooled reactors may employ a coolant gas such as carbon dioxide or helium for transferring heat energy from the reactor core to heat exchangers which produce vapor for power generation. In such a reactor, the circulating gas coolant is normally maintained at a very high pressure within a pressure vessel which encloses the reactor core. The pressure vessel may be of any suitable construction, such as welded metal or prestressed concrete.

In designing a nuclear reactor of the above described type, provision must be made for ensuring adequate containment of radioactive gases escaping from the pressurized vessel in the event of an accident resulting in rupture of the pressurized vessel, or in the event of a slow leak developing in the pressurized vessel. Design of such a containment system must also take into account the fact that the escaping gases may be at very high temperatures.

Typically, initial containment of gas in the event of rupture of the pressurized vessel is provided by the building in which the reactor is housed. The building may be designed so as to be able to contain a substantial increase in interior pressure without allowing the escape of dangerous radioactive gases to the ambient atmosphere. The design of a reactor building of sufficient strength to contain the substantially increased pressure resulting from rupture of the pressurized vessel results in very high building costs and also results in the interior pressure of the building being at a very high level subsequent to a rupture. Accordingly, reactor designs have had to provide some means for relieving the internal building pressure so that such pressure will not exist for an indeterminate length of time. As a result, so-called pressure relief systems have been designed for accommodating rupture of the pressurized vessel enclosing a reactive core.

Various designs of pressure relief systems for nuclear reactors are known in the art. Prior art designs have included means for collecting gas escaping from a ruptured pressurized vessel, cooling the escaping gas, and delivering it to a storage area capable of storing the collected gas at a pressure which is not excessive. The reactor building may be used as the means for collecting the escaping gas initially, or a separate containment structure surrounding the pressurized vessel within the reactor building may be used.

Prior art pressure relief systems, including the type described, have suffered from certain drawbacks. Construction of systems having extensive ducting and mechanical valving tends to be expensive, particularly because of the high reliability required in such systems. Moving parts in various mechanical valves increase the unreliability of any such system. Adequate cooling of the collected gas should be provided to minimize the containment volume required. This further complicates design of such systems. It may be difficult, in prior art systems, to obtain an indication of the readiness of the system to accept a full release of pressurized gas. The integrity of the containment vessel should also be periodically ascertainable. The stated problems are among only a few of those encountered in designing a pressure relief system for a nuclear reactor of the type described.

It is an object of the present invention to provide an improved pressure relief and containment system for a nuclear reactor having a pressurized vessel enclosing a reactor core.

Another object of the invention is to provide a pressure relief system in which pressure within a first containment enclosure is relieved to a second containment enclosure without the employment of moving mechanical parts.

Another object of the invention is to provide a pressure relief system employing means for cooling escaping gases.

It is another object of the invention to provide a pressure relief system of high reliability.

A further object of the invention is to provide a pressure relief system for a nuclear reactor having a pressurized vessel enclosing a reactor core in which gas escaping the pressurized vessel due to rupture thereof is ultimately contained at a pressure below atmospheric pressure in order to minimize the possibility of escape of such gas to the atmosphere.

Other objects of the invention in addition to those set forth herein will become apparent to those skilled in the art from the following description taken in connection with the accompanying drawings wherein:

FIG. 1 is a full section schematic view of a pressure relief and containment system constructed in accordance with the invention; and FIG. 2 is an enlarged full section view illustrating the pressure regulating fluid seal used in the system of FIG. 1.

Very generally, the pressure relief system of the invention comprises a first containment enclosure 11 enclosing a potential source 12 of contaminated gas in the event of an accident. A second containment enclosure 13 is provided and means 14 produce a subatmospheric pressure in the second containment enclosure. Duct means 15 convey gas from the first containment enclosure to the second containment enclosure. A pressure regulating fluid seal 16 is provided in the duct means for maintaining a separation between the first containment enclosure and the second containment enclosure. The fluid seal is breachable upon a rise in pressure to a predetermined level within the first containment enclosure.

Referring now more particularly to FIG. 1, the potential source of contaminated gas is a pressurized vessel 12. The vessel 12 comprises a generally cylindrical structure of prestressed concrete supported on an annular concrete base 21. The pressurized vessel 12 defines an interior main chamber 22 in which a reactor core 23 is disposed. The reactor core is comprised of the usual fissionable material and associated moderators and is suitably supported within the chamber 22 by means not shown. A plurality of control rod and fuel handling elements 25 extend through the top wall of the vessel 12 and into the core 23 for manipulating the control rods and fuel elements, not shown, which comprise the core.

In addition to the reactor core, the illustrated pressurized vessel 12 also encloses a plurality of steam generators 27, each of which is positioned within a respective satellite chamber 29. The satellite chambers 29 are arranged circumferentially about the main chamber 22. Ducts 31 connect the satellite chambers 29 with the main chamber 22 at the upper end thereof, and ducts 33 connect the satellite chambers with the main chamber at the lower end thereof. Suitable circulators, not shown, are utilized to circulate the pressurized coolant gas in a flow down through the core 23, through the passages 33, upwardly through the steam generators 27, back through the passages 31, and once more downwardly through the core. In this way, heat is transferred from the core to the steam generators for producing steam. Suitable ducting, not shown, connects the steam generators with a turbine plant for producing electricity.

In the illustrated system, the first containment enclosure 11 comprises the reactor building itself. The reactor building is constructed on a foundation 35 embedded below grade, indicated at 37. A track 39 spans the interior of the reactor building or enclosure 11 and a movable crane 41 rides on the track structure 39 for handling fuel elements, etc., during various maintenance operations carried out on the reactor. As an alternative, a shroud of other suitable enclosure may be disposed within the reactor building and surrounding the pressure vessel 12. In such instance, the shroud serves the function of providing the first containment enclosure, rather than the reactor building 11.

A vacuum breaker 43 is installed in the wall of the first containment enclosure. The purpose of this vacuum breaker is to limit the reduction in pressure which occurs upon cooling of the hot gases in the first containment enclosure at the conclusion of blowdown from rupture of the pressurized vessel. In this way, the structural loads on the first containment enclosure may be maintained within allowable limits. The vacuum breaker may be of any conventional design similar to a relief valve and bleeds air into the containment as required. For satisfactory operation, the vacuum breaker may be set to maintain a pressure level within the first containment enclosure that does not exceed 1 psi vacuum with respect to atmosphere.

To ensure the integrity of the first containment enclosure (reactor building 11), the first containment enclosure is constructed to provide gas tightness and a static pressure capability based on maximum pressure which results from rupture of the vessel 12. To this end, the interior surface of the first containment enclosure 11 may be coated with a suitable elastomer or epoxy to enhance its integrity under such circumstances.

The second containment enclosure 13 is positioned nearby the first containment enclosure 11 and is supported on a concrete slab foundation 47 slightly below grade 37. The second containment enclosure 13 is of suitable vacuum tight construction, such as steel or reinforced concrete. The vacuum pump system 14 evacuates the interior of the second containment enclosure 13 through a duct or series of ducts 49. To ensure the leak-tight integrity of a concrete type of secondary containment enclosure, the outer surface of the enclosure may be coated with an elastomer or epoxy coating. The floor or slab 47 is sloped to a central opening 48, described below, for drainage. A baffle 50 is suitably supported by means not shown above the central opening 48 to aid retention of water in the valve 16 during blowdown, described below.

In the illustrated system, the duct means 15 comprise a horizontal duct 15 extending below grade a distance sufficient to provide proper biological shielding. The duct provides communication between the interior of the first containment enclosure 11 and the interior of the second containment enclosure 13. In the illustrated embodiment, the duct 15 communicates with the interior of the second containment enclosure through the fluid seal 16. In addition to the duct 15, a substantially smaller diameter tube 51 also communicates with the interior of the second containment enclosure 13 through the seal 16 and communicates with the interior of the first containment enclosure 11 through a valve 53. The function of the pipe 51 and valve 53 is explained more fully below.

The fluid seal 16, as will be explained in detail below, maintains a separation between the first containment enclosure 11 and the second containment enclosure 13 and is breachable upon a predetermined rise in pressure within the first containment enclosure due to a rupture of the pressurized vessel 12 to allow gas flow from the interior of the first containment enclosure into the second containment enclosure.

Referring now more particularly to FIG. 2, which is an enlarged view of the lower right-hand portion of FIG. 1, a cylindrical wall 55 depends from the base 47 of the enclosure 13, and a suitable opening in the base 47 communicates with the upper part 56 of the region defined by the wall 55. The wall 55 extends downwardly and is supported on a base 57 embedded deeply below grade 37. The region defined by the cylindrical wall 55 and the base 57 is divided by a horizontal wall 59 extending thereacross to define a lower part of overflow chamber 58.

The duct 15 passes through a suitable opening in the cylindrical wall 55, bends at a right angle downwardly, and terminates in a diffuser section of gradually enlarging diameter. Below elevation $c$ the diffuser section 61 is provided with a plurality of openings 62 therein to form a perforated frustoconical section within the upper part or chamber 56 within the cylindrical wall 55 and above the horizontal wall 59. The pipe 51 also terminates within the same chamber at a level $h$ higher than the level $b$.

A wall 65 of inverted L-shaped cross section surrounds the interior of the lower part of the upper chamber 56 just above the floor or horizontal wall 59, forming with the wall 55 an annulus 66. The wall 65 is comprised of a suitable metal and is embedded with the end of its short leg in the wall 55 thus forming an annular space. The short leg extends generally horizontally and the lower leg extends generally vertically. The end of the longer leg of the L-shaped cross section wall 65 terminates a short distance above the wall 59, this distance being indicated by the distance between $d$ and $e$ in FIG. 2.

A plurality of stand pipes 67 are arranged vertically in the annulus 66 formed by the wall 65. The lower ends of the stand pipes are embedded in and supported by the wall 59 and pass through suitable openings therein to communicate with the lower part or chamber 58 below the wall 59. The stand pipes 67 are of equal height, extending to the level b in FIG. 2 and form a weir for maintaining the height of the hydrostatic head within the annulus formed by the wall 65 at a constant maximum level.

The region within the annulus 66 above the stand pipes is maintained at a reference pressure which is substantially constant. In the illustrated embodiment, the reference pressure is achieved by connecting the region above the weirs 67 to atmosphere through a suitable vent pipe 69. The function of the fluid seal 16 is such as to prevent the entrance of contaminated gases into the annulus 66 formed by the walls 55 and 65, and thus no gases can enter the vent pipe 69.

In order to fill the upper chamber 56 of the fluid seal 16, a deep well pump 71 is provided suitably mounted exteriorly of the enclosure 13. A tube 73 connects the lower chamber of the fluid seal 16 with the pump 71. The tube 73 terminates in the lower chamber through a suitable opening formed in the base 57. Outflow from the pump 71 is discharged through a tube 75, which enters the enclosure 13 through a suitable opening, passing horizontally therethrough until it is above the fluid seal 16. The tube 75 then turns downwardly and passes through an opening in the short leg of the wall 65, terminating in the region within the annulus 66 above the upper ends of the stand pipes 67. The alignment of the tube 75 is such as to terminate in a region offset from any of the stand pipes in order that the tube will not discharge any of its contents directly into the stand pipes beneath.

In preparing the pressure relief system for normal operation of the nuclear reactor, assuming that the interior of the second containment enclosure 13 is at atmospheric pressure to start with and the chamber 58 below the wall 59 is filled with water, the pump 71 is switched on to deliver water into the upper chamber 56. The water in the upper chamber will fill to the level b, after which it will spill over the weir into the lower chamber.

Once the upper chamber has been filled to the level b, the vacuum pump system 14 (FIG. 1) is switched on to evacuate the second containment enclosure 13. As the pressure within the containment enclosure 13 lowers, the water within the upper chamber 56 will rise higher than the level of the weir, and additional water required to fill the chamber 56 is supplied by operating the pump 71. When the enclosure 13 is evacuated to the desired level, the vacuum pump system is switched off and the pump 71 may also be switched off. The filled level is indicated at a. Preferably, means (not shown) are provided for maintaining a constant low water temperature to maintain the vapor pressure substantially below the pressure level within the second containment enclosure 13.

The principle of operation is based on a constant pressure head at level c during all phases of operation. Three separate and equal pressure heads act at level c. All are equal to atmospheric pressure plus the hydrostatic head formed by the vertical distance between levels b and c (hereafter referred to as pressure head b-c). The pressure head b-c is equal to the system relief setting and can be adjusted as desired by changing the vertical distance between b and c. Level b is indicated as the top of the weirs 67. The upper row of holes in diffuser 61 forms level c as previously noted. Thus, by changing the elevation of the upper row of holes (level c) or by changing the height of the weirs (level b), the vertical distance between levels b and c can be changed and any desired relief setting obtained.

The first of the three pressure heads noted above acts at level c inside the annulus 66. The volume above the top of the weirs is vented to atmosphere. Thus the pressure at level c is equal to atmospheric pressure plus pressure head b-c. Pressure head b-c can not be exceeded since the water level in the annulus can not rise above the top of the weirs. A residual amount of water is maintained in the collecting chamber 58. Pump 71 constantly draws water from this residual volume through line 73 and returns it via line 75 to the top of the annulus 66. Thus the level of water in annulus 66 can not fall below level b. Excess water delivered by pump 71 spills over the weirs and is returned to the collecting chamber below. Thus it can be seen that pressure head b-c can not change and the pressure at level c inside the annulus 66 is therefore always equal to atmospheric pressure plus pressure head b-c.

The second of the three pressure heads acts at level c inside chamber 56. This pressure head is formed by the summation of the pressure inside the second containment enclosure plus the hydrostatic head between level a and b (hereafter referred to a pressure head a-b) plus pressure head b-c. The second containment vessel 13 is maintained at a high vacuum level by the vacuum pump system 14.

It can be seen by inspection of FIG. 2 that for equilibrium conditions to exist, the pressure inside the second containment vessel plus pressure head a-b must always equal atmospheric pressure. To state it in another way, the pressure head a-b which can be supported above level b is precisely equal to atmospheric pressure minus the pressure in the second containment vessel. Thus if the pressure in the second containment enclosure increases for any reason, the full height of pressure head a-b can no longer be supported and water level a will drop. Under such circumstances, the excess water will spill over the weirs in the annulus 66 and collect in the chamber 58. From the above, it is evident that the pressure level at c in the chamber 56 is always equal to atmospheric pressure plus pressure head b-c.

The third of the three pressure heads acts at level c inside the diffuser section 61. Pressure inside the duct 15 is equal to the pressure inside the first containment enclosure which is at atmospheric pressure during standby. Pressure at level c is therefore equal to atmospheric pressure plus hydrostatic head b-c.

Upon rupture of the vessel 12, the pressure in the first containment enclosure and connecting duct means 15 rises, depressing the water level inside the diffuser 61. The increase in this pressure is exactly compensated for, at level c, by the reduction in the hydrostatic head between b and c caused by the drop in water level in the diffuser 61. The rise in pressure in the duct and the first containment vessel can not exceed the hydrostatic head b-c, since it is relieved by the escape of gas through the holes 62. Hence, gas pressure is relieved when the water level inside the diffuser 61 reaches the level of the holes at level c. Pressure at level c therefore remains constant at atmospheric pressure plus hydrostatic head b-c during both standby and flow conditions.

The gas escaping through the holes 62 of the diffuser 61 bubbles up through the water in the chamber 56 and flows into the second containment vessel. Most of any steam contained in the flowing gas will be condensed as it passes through the water in the upper chamber 56 of the fluid seal 16. The rise in pressure in the second containment enclosure is exactly compensated for by the reduction in pressure head $a$-$b$ as described in the previous paragraphs.

The volume of the enclosure 13 is designed to contain the full inventory of gas in the vessel 12 during a maximum credible accident and still be below atmospheric pressure. The pressure within the first enclosure 11 will rise to a maximum depending upon the pressure drop in the duct 51 and pressure seal 16, and will gradually decay to the water seal relief setting, pressure head $b$-$c$, as the gas flow decays to zero. As the gas cools in the primary enclosure 11, the pressure will continue to decrease and stabilize at a sub-atmospheric pressure level. As a result, within a few minutes of the end of an accident of maximum credible proportions, all contaminated gas is contained at a pressure below atmospheric pressure and no outward leakage occurs either from the primary enclosure 11 or the secondary enclosure 13. As previously described, vacuum breaker 43 may be required in the primary enclosure to prevent the negative pressure from exceeding building design limits.

In the case of a very slow depressurization of the pressure vessel 12, the pressure within the enclosure 11 may remain below the level needed to breach the fluid seal 16. Under such conditions, the reactor operator may open the valve 53 to allow gas flow through the tube 51 into the fluid seal 16. The exit point of the tube 51 is routed to level $h$ within the chamber 56 which is slightly above level $b$. This automatically provides an alternate relief setting for the first containment enclosure, which is equal to atmospheric pressure minus the hydrostatic head of the vertical distance between levels $b$ and $h$. Level $b$ within chamber 56 is always referenced to atmospheric pressure as noted in the prior discussions. Thus in the case of a small leak from the pressurized vessel 12, and also during stand-by conditions, the pressure level within the first containment enclosure can be maintained at a level slightly below atmospheric pressure by opening the valve 53. This again assures that radioactive gases can not escape to the atmosphere since both containment enclosures remain sub-atmospheric.

Although any suitable fluid may be used in the fluid seal 16, the particular illustrated embodiment has been described in connection with water. Under such conditions, satisfactory designs may include a minimum pressure within the second containment enclosure 13 of 1.0 p.s.i.a., with the level $a$ being 31.6 feet above the level $b$, the weir level. The dimensions $b$-$c$ may be 1.15 feet to produce a relief setting of 0.5 p.s.i.g. The distance $c$-$d$ may be designed at 8 feet, the distance $d$-$e$ at 1 foot, and the distance $f$-$g$ at 36 feet, assuming a chamber diameter of 30 feet, an annulus inner diameter of 22 feet, and a maximum diameter of 20 feet for the diffuser section 61. Assuming a 9 foot inner diameter for the duct 15, the total pressure drop of the duct and water seal system could rise to about 2 ½ p.s.i. during maximum flow conditions, while the minimum pressure required to cause gas to flow into the enclosure 13 is about ½ p.s.i.g. Under such conditions, the reactor building pressure during pressure vessel rupture will rise to a maximum of about 2 ½ p.s.i.g., and then drop off to about ½ p.s.i.g. at the end of depressurization. Subsequent cooling, as mentioned before, will drop this pressure to below atmospheric In the system of the invention, all gas released to the enclosure 13 is cooled by bubbling through water and thus, the containment volume required is minimized. During the depressurization accident, no moving parts have to work and thus the system is entirely static in a mechanical sense. A determination may be made of the readiness of the system to accept full gas release by a simple measurement of absolute pressure within the enclosure 13. The enclosure 13 may be designed with a given leak rate, in which case periodic operation or minimum level operation of the vacuum pump system 14 may be desirable. The leak rate may be readily measured by the flow through the vacuum pump system, and thus the second containment enclosure may be continuously monitored for leaks. Pressure in the enclosure 13 is always subatmospheric and the gas therewithin is cooled even after depressurization or blowdown of the vessel 12. Pressure in the enclosure 11 also returns to sub-atmospheric shortly after blowdown, resulting in all discharged gas being contained at sub-atmospheric pressure to eliminate chance of discharge into the ambient atmosphere. Any steam released into the system is condensed in the fluid seal 16. Since the enclosure 13 is constantly at sub-atmospheric pressure, it may be constructed of concrete to take advantage of a certain level of atmospheric prestressing.

The invention is particularly applicable to a situation in which two reactors are operated adjacent each other, assuming that the simultaneous failure of the pressure vessels of both reactors is incredible. in such circumstances, considerable economies may be derived in constructing the reactors, since only a single secondary pressure containment system is required.

It may therefore be seen that the invention provides an improved pressure relief and containment system. The pressure relief system of the invention is of high reliability and relatively low cost. Adequate containment of contaminated gases released during an accident is provided at sub-atmospheric pressure to minimize chances of contamination exiting to the ambient atmosphere.

Various modifications of the invention in addition to those shown and described herein will become apparent to those skilled in the art from the foregoing description and accompanying drawings. Such modifications are intended to fall within the scope of the appended claims.

What is claimed is:

1. A pressure relief and containment system for a potential source of contaminated gas, comprising, a first containment enclosure for enclosing the potential source for receiving gas from the source, a second containment enclosure, means for producing a subatmospheric pressure in said second containment enclosure, duct means for conveying gas from said first containment enclosure to said second containment enclosure, and a pressure regulating fluid seal in said duct means for maintaining a separation between said first containment enclosure and said second containment enclosure, said fluid seal being breachable upon a rise in pressure within said first containment enclosure to a predetermined level to allow gas flow from said first containment enclosure into said second containment enclosure, said fluid seal including a main chamber in communication with said second containment enclosure, a second chamber, an overflow chamber, a wall separating said main chamber from said second chamber, a passage in said wall communicating between said main chamber and said second chamber, a weir between said second chamber and said overflow chamber and above the level of said passage, means for maintaining atmospheric pressure in said second chamber above said weir, and means for filling said main chamber with fluid to a level above that of said weir to provide a pressure head sufficient to offset the difference in pressure between said first containment enclosure and said second containment enclosure, said duct means being of a configuration to communicate with said main chamber at a discharge level both below that of said weir and above that of said passage.

2. A system according to claim 1 wherein said duct means include a perforated diffuser section at said discharge level.

3. A system according to claim 1 including a second duct communicating between said first containment enclosure and said second containment enclosure for reducing the pressure level in said first containment enclosure, said second duct terminating in said main chamber at a level above that of said weir, and a valve selectively operable to open and close said second duct, whereby the pressure in said first containment enclosure may be reduced to subatmospheric.

4. A pressure relief and containment system for a potential source of contaminated gas, comprising, a first containment enclosure for enclosing the potential source for receiving gas from the source, a second containment enclosure, means for producing a pressure in said second containment enclosure substantially less than the pressure in said first containment enclosure, first hydrostatic head forming means having the region above the hydrostatic head formed thereby communicating with said second containment enclosure, second hydrostatic head forming means, and duct means communicating between said first containment enclosure and said first hydrostatic head forming means below the level of said weir and above given level. means and means for maintaining a constant reference pressure thereabove, said first and second hydrostatic head forming means communicating at a given level, overflow collecting means communicating with the region above the hydrostatic head formed by said second hydrostatic head forming means, a weir separating said overflow collecting means from said second hydrostatic head forming means to maintain a constant level of the hydrostatic head formed by said second hydrostatic head forming means, and duct means communicating between said first containment enclosure and said first hydrostatic head forming means below the level of said weir and above said given level.

5. A pressure relief system according to claim 4 wherein said reference pressure is atmospheric pressure.

6. A pressure relief system according to claim 4 wherein said first hydrostatic head forming means comprise a generally cylindrical chamber depending from said second containment enclosure, wherein said second hydrostatic head forming means comprise an annulus formed within said cylindrical chamber, wherein said overflow collecting means comprise a chamber positioned at a lower level than said cylindrical chamber, and wherein said weir comprises a plurality of stand pipes within said annulus.

* * * * *

UNITED STATES PATENT AND TRADEMARK OFFICE
CERTIFICATE OF CORRECTION

PATENT NO. : 3,889,707
DATED : June 17, 1975
INVENTOR(S) : H. Peter Fay and William S. Peck It is certified that error appears in the above–identified patent and that said Letters Patent are hereby corrected as shown below:

Column 3, line 34  "of" should be --or--.

Column 6, line 28  "a" should be --as--.

Column 6, line 41  "a" should be in italics.

Column 7, line 55  "a" should be in italics.

Column 8, line 35  "in" should be --In--.

Column 10, line 5  delete "means, and duct means communicating between said first containment enclosure and said first hydrostatic head forming means below the level of said weir and above said given level. means and"

Signed and Sealed this twentieth Day of April 1976

[SEAL]

Attest:

RUTH C. MASON
Attesting Officer

C. MARSHALL DANN
Commissioner of Patents and Trademarks